United States Patent

Cariola et al.

[11] Patent Number: 5,117,630
[45] Date of Patent: Jun. 2, 1992

[54] PIVOTING DOOR THRUST REVERSER

[75] Inventors: Roy E. Cariola, San Diego; Thadeus N. Grace, Chula Vista, both of Calif.

[73] Assignee: Rohr Industries, Inc., Chula Vista, Calif.

[21] Appl. No.: 683,587

[22] Filed: Apr. 11, 1991

Related U.S. Application Data

[63] Continuation of Ser. No. 478,449, Feb. 12, 1990, abandoned.

[51] Int. Cl.⁵ .............................................. F25B 49/00
[52] U.S. Cl. ..................... 60/226.2; 60/230; 244/110 B
[58] Field of Search ................ 60/226.2, 230; 244/110 B, 12.5, 23 D

[56] References Cited

U.S. PATENT DOCUMENTS

| | | | |
|---|---|---|---|
| 4,030,687 | 6/1977 | Hapke | 244/110 B |
| 4,858,430 | 8/1989 | Belbouche | 60/230 |
| 4,916,895 | 4/1990 | Dubois | 60/230 |
| 4,922,712 | 5/1990 | Matta et al. | 60/226.2 |

FOREIGN PATENT DOCUMENTS 2635825  3/1990  European Pat. Off. ........... 60/226.2

Primary Examiner—Richard A. Bertsch
Assistant Examiner—Michael I. Kocharov
Attorney, Agent, or Firm—Patrick J. Schlesinger; Frank D. Gilliam

[57] ABSTRACT

A pivot door type aircraft turbine engine thrust reverser which includes a pair of pivoting panels on the inner side of the door. The panels are positioned alongside the door actuation mechanism. The panels form a flush surface along the fan duct flow path when stowed during normal engine operation in flight. When the door is deployed in thrust reversing mode, one end of the door moves to at least partially block airflow through the duct and divert it out along the door through an opening uncovered by door deployment. During door deployment, a linkage moves the panels toward the outer surface of the door, exposing a door deflector plate to the airflow. Air flows along the door, then along the panel, out through the opening, then impacts the deflector plate which deflects the airflow in the reverse direction.

8 Claims, 4 Drawing Sheets

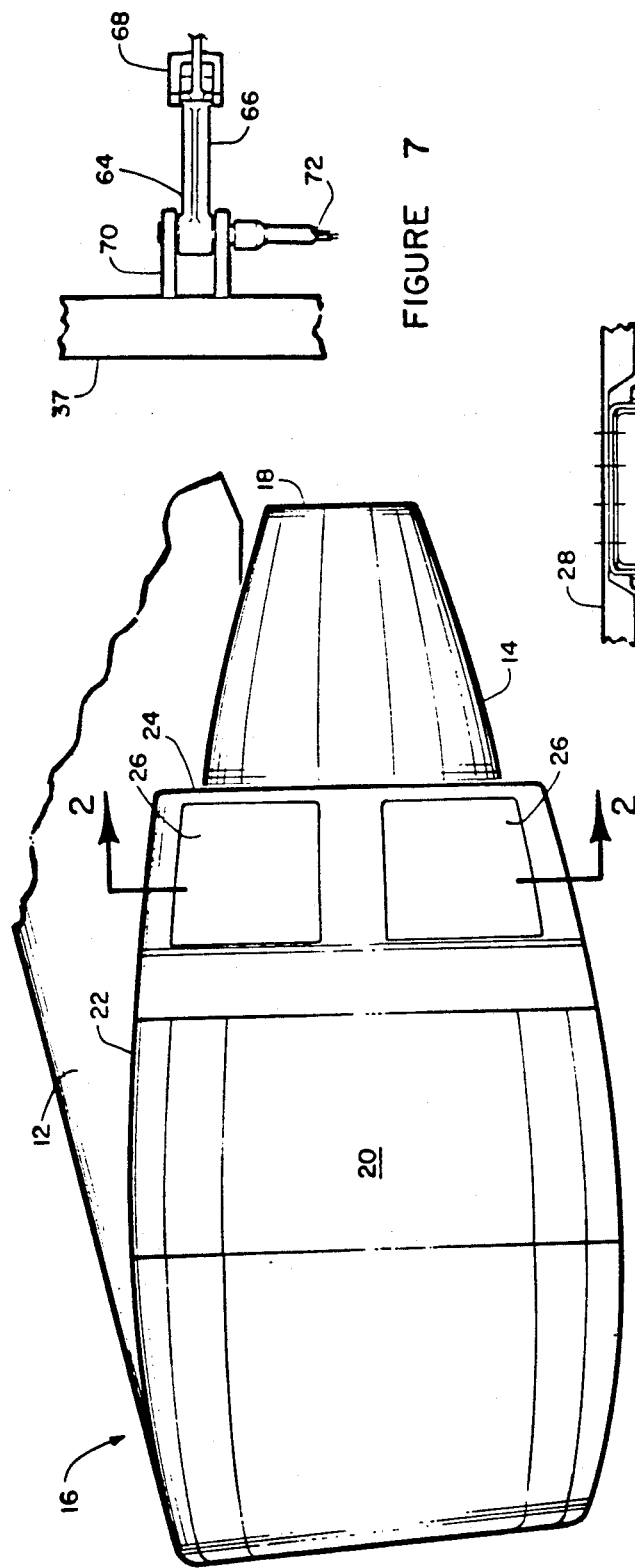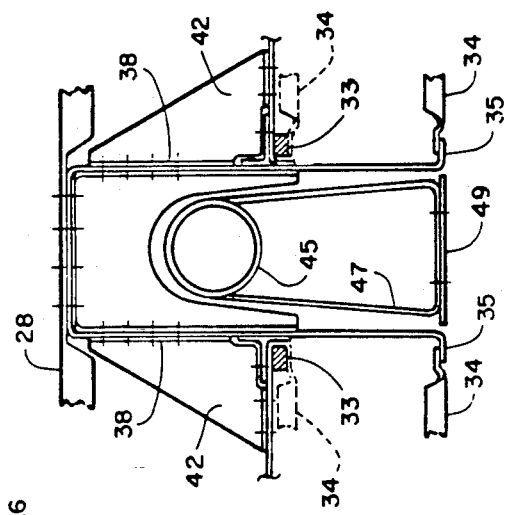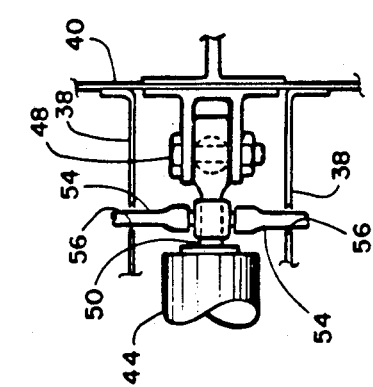

PIVOTING DOOR THRUST REVERSER

This application is a continuation of application Ser. No. 478,449, filed Feb. 12, 1990, now abandoned.

BACKGROUND OF THE INVENTION

This invention relates in general to pivot door type thrust reverser for aircraft turbine engines and, more particularly, to such a door including panels movable between a stowed position and a position aiding reversal of thrust direction.

Modern aircraft fan jet engines have a nacelle or shroud surrounding the engine, spaced outwardly from the core engine cowl to define an annular passage or duct for flow of air rearwardly from the outer portion of an enlarged axial flow compressor. In this type of engine, a large proportion of the total thrust is developed by the reaction to the air driven rearward by the fan and the balance results from ejection of the exhaust gas stream from the engine.

Aircraft using engines of this type tend to have high landing speeds, placing great stress on wheel braking systems and requiring very long runways. To reduce this braking requirement and permit use of shorter runways, means are now provided in such engines for reversing at least a major portion of engine thrust during the landing roll. Many different types of thrust reversers have been designed, of varying effectiveness.

One type, primarily used with non-fan type turbine engines, uses large, sturdy clam-shell like blocker doors which swing directly behind the jet exit nozzle and diverge forwardly to reverse thrust. This system must be very heavy and strong and is not easily applied to fan jet engines.

Another type of thrust reverser uses cascade sets in the sidewalls of the shroud or outer housing with devices for uncovering the cascades and blocking airflow through the annulus aft of the cascades to direct airflow through the cascades, which turn the airflow in a forward direction. Typical cascade type thrust reversers include those disclosed by Montgomery in U.S. Pat. No. 4,145,877 and Hom et al in U.S. Pat. No. 3,500,646. While often effective, these systems are mechanically complex, requiring a great many cooperating components.

Still another design uses pivotable doors lying in openings in the sidewall of the shroud or nacelle which pivot outwardly while a second set of doors pivot inwardly to block flow of air through the duct and direct it to the outwardly extending doors which direct airflow rearwardly. Typical of these is the system disclosed by Ellis in U.S. Pat. No. 3,612,401. This system, while useful, tends to be heavy and mechanically complex.

Yet another design uses a plurality of pivotable doors located in openings arranged radially around the shroud. Each door pivots so that one end nearly contacts the engine cowl blocking airflow through the annular duct while the other end extends outside the nacelle in a direction directing airflow forwardly. Typical of these is the system disclosed by Maison et al in U.S. Pat. No. 3,605,411. While having greater mechanical simplicity than other systems, it is difficult with this arrangement to provide optimum duct airflow blocking and optimum flow re-direction in the reverse direction.

Thus, there is a continuing need for improved thrust reversing systems for use in ducted fan jet engines which combine highly effective flow reversal with low cost, light weight, mechanical simplicity and ease of maintenance.

SUMMARY OF THE INVENTION

The above-noted problems, and others, are overcome by the thrust reversing system of this invention which basically comprises a plurality of radially disposed doors located in the engine shroud. Each door in the stowed position fills an opening through the shroud with the door inner and outer walls conforming to the adjacent inner and outer shroud walls. Each door is pivotably mounted to the shroud intermediate the forward and aft ends of the door. An actuator moves the door from the stowed position to the deployed position when thrust reversal is required. The aft end of the door moves inwardly of the shroud nearly into contact with the engine cowl to at least partially block airflow through the duct between shroud and cowl. The forward end of the door extends out of the shroud in a generally forward direction, so that the blocked airflow moves out of the shroud opening and along the door in a flow reversed direction.

The forward end of the door tends to be rather thick in order to conform to the spacing between the inner and outer shroud walls when the door is stowed. A very significant improvement is obtained by adding a pivotable panel forming the inner wall of the door at its forward end, together with a lightweight fixed deflector plate extending inwardly from the forward edge of the door. The panel forms a portion of the inner wall of the door in the stowed position, providing a streamlined continuation of the inner shroud wall. When the door is deployed, an actuator moves the forward end of the panel toward the outer door wall. Reverse airflow moves along the panel until it encounters the deflector plate which deflects airflow in the reverse direction. Without this panel and deflector plate, air flows more outwardly than in the desired reverse direction, reducing efficiency.

BRIEF DESCRIPTION OF THE DRAWING

Details of the invention, and of a preferred embodiment thereof, will be further understood upon reference to the drawing, wherein:

FIG. 1 is a schematic side elevation view of a typical ducted fan jet engine incorporating the thrust reverser of this invention;

FIG. 4 is a detail section view of the door actuator, taken on line 4—4 in FIG. 3;

FIG. 5 is a detail section view taken on line 5—5 in FIG. 3;

FIG. 7 is a detail section view of the panel actuator, taken on line 7—7 in FIG. 6.

DETAILED DESCRIPTION OF PREFERRED EMBODIMENTS

Figure 2:
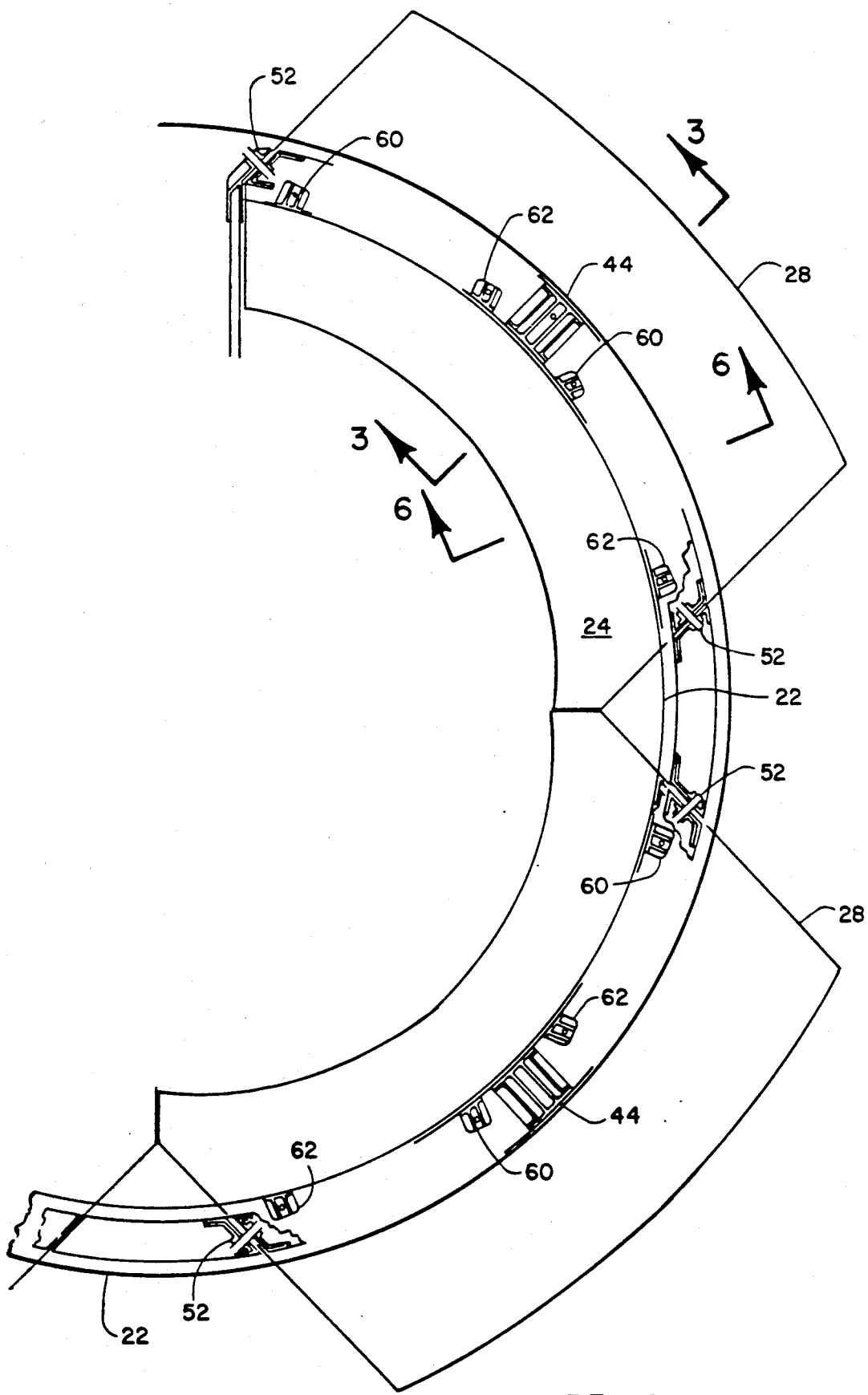
FIG. 2 is a transverse section view showing one half the thrust reverser array, taken on line 2—2 in FIG. 1.

Referring now to FIG. 1 there is seen an aircraft engine assembly 10 of the ducted fan type, connected to an aircraft (not shown) by a pylon 12. An engine is enclosed in a cowl 16, the aft end of which terminates in an exit nozzle 18. The engine includes an axial flow compressor or fan located in approximately region 20. The fan is surrounded by a shroud 22, forming and annular duct 24 through which the fan forces air rearwardly.

The shroud 22 includes a plurality (in this embodiment, four, two on each side) thrust reverser assemblies 26. The overall structure of the thrust reverser assemblies 26 is shown in FIGS. 2 and 3, which are transverse and axial sections therethrough, FIG. 2 showing essentially one-half the circumference of the engine.

Figure 3:
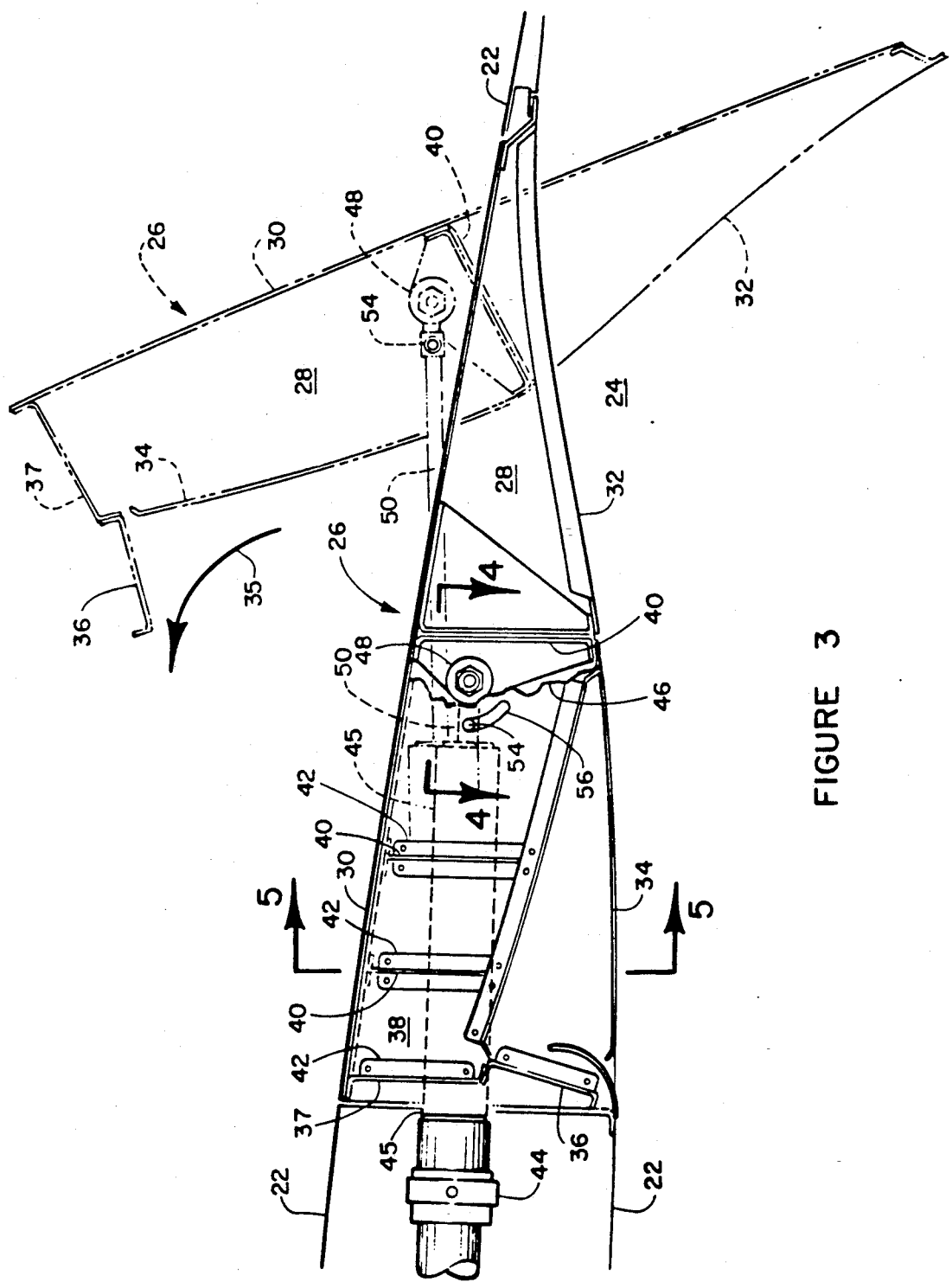
FIG. 3 is an axial section view of one thrust reverser door, taken on line 3—3 in FIG. 2.

FIG. 3 shows thrust reverser assembly 26 in the stowed position in solid lines and in the deployed position in phantom. Assembly 26 includes a door 28 having an outer wall 30 which forms a streamlined part of the outer wall of shroud 22 when in the stowed position, an inner wall 32 which forms a streamlined portion of the inner wall of duct 24, a movable panel 34 (described in detail below) which forms a streamlined portion of the inner wall of duct 24 and a deflector plate 36 secured to forward door frame 37 which extends between outer wall 30 and the panel 36 when in the stowed position.

Axial bulkheads 38 are connected to transverse bulkheads 40 by reinforcing angles 42 in a conventional manner to form a structure having the desired strength. For clarity, not all such reinforcements as might be used are shown in these schematic representations.

Each door 28 is mounted for rotation on a set of pivot fittings 52 secured within shroud 22. The nea axial bulkheads 38 are cutaway at 46 to show the connection 48 and a transverse door bulkhead 40, as further detailed in FIG. 4. Actuator 44 includes a hydraulic cylinder 45 on a support means 47 which extends into door 28 (as best seen in FIG. 5) which extends rod 50 to rotate door 28 from the stowed to the deployed position. Door 28 rotates about pivots 52 as seen in FIG. 2. Each door 28 is mounted within shroud 22 by a pair of pivot fittings 52 (FIG. 2). On command to actuator 44, hydraulic cylinder 45 extends, rotating door 28 to the deployed position shown in FIG. 3. The extent of rotation of door 28 to the deployed position is constrained by the stroke of actuators 44.

Figure 6:
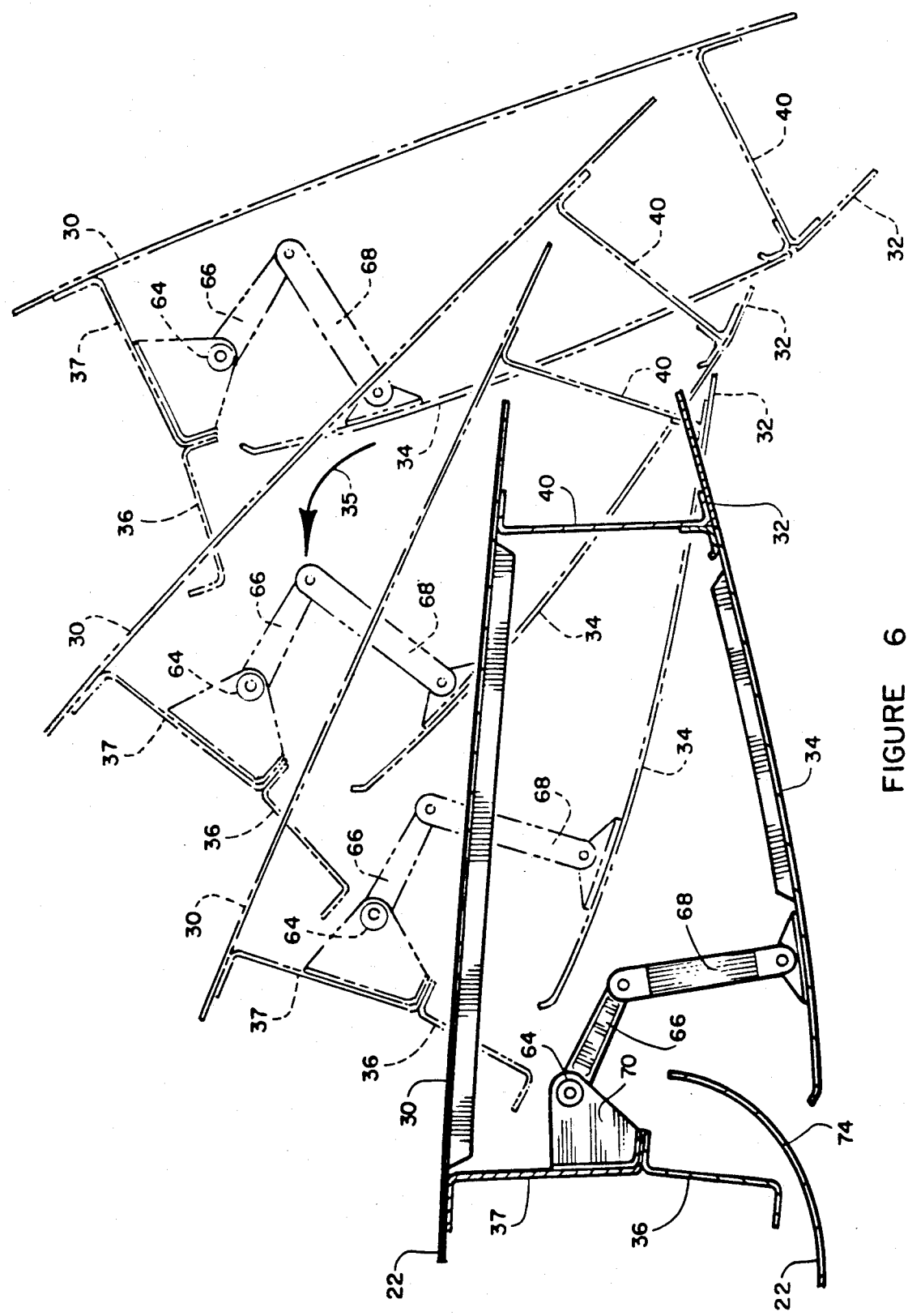
FIG. 6 is a schematic view of the panel, illustrating the deployment sequence, taken approximately along line 3—3 in FIG. 1.

Details of the operation of panel 34 and the relationship of panel 34 to deflector plate 36 are best seen in FIGS. 6-7. FIG. 6 shows a schematic axial section view taken on line 6—6 in FIG. 2. That is generally similar to the view of FIG. 3, except that this view is adjacent to the centerline of door 28. There are two panels 34 in each door assembly, one on each side of the central door actuator assembly 44. As can be seen in FIG. 5, a spacer plate 49 is attached to the actuator support means 47 adjacent to the duct 24. This spacer plate 49 fills the space between the two adjacent panels 34 when the panels are in their deployed position.

Each movable panel 34 is hinged to bulkhead 40 at the point where they meet. The pair of hinges 60 and 62 for each panel 34 are seen only in FIG. 2. Panels 34 are moved from the stowed position shown in solid lines through a series of positions shown in broken lines to the fully deployed position shown in the furthermost broken line illustration in FIG. 6 by an actuator 64 acting through links 66 and 68. As seen in FIG. 5 upward stops 33 limits upward movement of panels 34, while downward movement is limited by inwardly projecting edges 35 on bulkheads 38. Actuator 64 includes a bracket 70 mounted on forward door frame 37 and a flexible cable rotation means 72 (as seen in FIG. 7) which is rotated by the motion of the door actuator 45 in respect to the position of door 28.

When door 28 is moved to the deployed position, the inner wall contacts or nearly contacts cowl 16, at least partially blocking airflow through duct 24 and forcing the air to flow out through the opening left when the door moved upward. A curved end 74 is provided at the inside edge of shroud 22 to smooth the flow of air up toward that opening. Air flows upwardly, strikes the deflector plate 36 and is redirected in a direction opposite to that of normal flow through duct 24 as schematically indicated by arrows 35, thus producing optimum thrust reversal. Without movable panel 34, panel 34 would align with the lower edge of plate 36 in the deployed position, so that airflow would be in an almost vertical direction, severely reducing the thrust reversal effect. Deflector plate 36 is fixedly mounted on frame 37, providing considerable improvement in rigidity, reliability and weight reduction when compared to prior deflectors which move between folded and extended (deployed) positions. Our assembly permits a fixed deflector plate without interference with other components.

While certain preferred mechanisms and arrangements were detailed in the above description of preferred embodiments, those may be varied, where suitable, with similar results. For example, any suitable actuation means may be used for causing rotation and translation of door 28 and movement of panel 34. Other variations and applications of this invention will become apparent to one skilled in the art upon reading this disclosure. Those are intended to be included within the scope of this invention, as defined in the appended claims.

We claim:

1. In a fan jet aircraft engine having a jet engine enclosed in a cowl terminating in an exhaust nozzle at the aft end, an axial flow compressor at the forward end of said engine having fan blades extending outwardly of said cowl, a shroud enclosing said fan and cowl and defining an annular air duct therebetween through which air from said fan can travel and thrust reversing means in said shroud for selectively either allowing airflow rearwardly through said duct or directing at least a portion of said airflow through openings in said shroud and into a forwardly direction; the improvement wherein said thrust reversing means comprises:

a plurality of doors located in openings radially arranged in said shroud, each door in a stowed position filling an opening and havnig inner and outer walls conforming to the inner and outer surfaces of said shroud;

each door including a door pivot means intermediate the forward and aft ends of said door, said door privot means permitting said doors to rotate about an axis lying in a plane perpendicular to the engine centerline;

door actuator means between said shroud and each door adapted to rotate said door about said door pivot means from said stowed position to said deployed position in which the aft end of said door engages or nearly engages the outer wall of said cowl and the forward end of said door extends beyond said shroud in a forwardly direction, whereby at least a portion of airflow through said duct is deflected in an outwardly and forwardly direction;

two panels having a space therebetween moutned on each of said dorrs, one of said panels positioned on each side of said door actuator means and each panel including a panel pivot means at the aft end of the panel permitting said panel to be moved from a stowed position forming a portion of the inner wall of said door and substantially conforming to the inner shroud surface and a deployed position pivoted toward the door outer wall;

a spacer carried by each of said door actuator means for substantially filling the space between said two panels adjacent thereto when said two panels are in their stowed position;

a deflector plate fixedly mounted on the forward end of the outer wall of each door, said deflector plate extending toward the engine centerline when said door is stowed; and panel actuator means adapted to progressively move each of said panels between stowed and deployed positions, said panel means comprises a pair of links pivotly interconnected to each other at one end with the distal end of one of said links pivotly connected to the inner surface of said panel and the distal end of the other link pivotly connected to the inner surface of said deflector plate intermediate the distal end of said deflector plate and said door;

whereby when said door is in the deployed position and the panels re deployed, airflow is directed along the inner surface of said deployed panels and said spacer, then against the deflector plate which deflects airflow in a more rearwardly direction enhancing thrust reversal.

2. The improvement according to claim 1 wherein each engine is provided with four of said doors, each of which includes two of said panels.

3. The improvement according to claim 2 wherein said door actuator extends axailly into said door from said shroud at about the forward center edge of said door and said two panels are positioned adjacent to said door actuator.

4. The improvement according to claim 1 wherein said door actuator includes means for both rotating said door about said door pivot and for translating said door in an aft direction during deployment so that said door is adjacent to the aft end of said opening when said door is fully deployed.

5. The improvement according to claim 4 wherein said door actuator further includes at least one pin co-operating with a slot on said door to limit door rotation during deployment.

6. The improvement according to claim 5 wherein each door includes a pair of said panels, located adjacent to a central actuator in said door.

7. The improvement according to claim 6 wherein each engine is provided with four of said doors, each of which includes two of said panels.

8. The improvement according to claim 6 wherein said door actuator includes means for both rotating said door about said pivot and for translating said door in an aft direction during deployment so that said door is adjacent to the aft end of said opening when said door is fully deployed.

* * * * *